United States Patent [19]
Stutz

[11] 3,912,383
[45] Oct. 14, 1975

[54] FILM TRANSPORT

[76] Inventor: William H. Stutz, 11672 Margate St., North Hollywood, Calif. 91601

[22] Filed: Oct. 23, 1973

[21] Appl. No.: 408,623

[52] U.S. Cl. ............... 352/129; 352/119; 352/166; 352/180
[51] Int. Cl.² ......................................... G03B 21/00
[58] Field of Search ........... 352/119, 120, 180, 181, 352/182, 190, 129, 84, 166

[56] References Cited
UNITED STATES PATENTS

| | | | |
|---|---|---|---|
| 2,278,781 | 4/1942 | Harrison | 352/119 |
| 2,498,580 | 2/1950 | Roger | 352/119 |
| 3,248,029 | 4/1966 | Money | 352/180 X |
| 3,351,253 | 11/1967 | Nemeth | 352/166 X |
| 3,459,472 | 8/1969 | Husted | 352/129 |
| 3,480,353 | 11/1969 | Buck | 352/84 X |
| 3,565,521 | 2/1971 | Butler | 352/180 |
| 3,746,441 | 7/1973 | Kotler | 352/169 |
| 3,767,298 | 10/1973 | Reinsch | 352/169 |
| 3,791,725 | 2/1974 | Young | 352/129 |

FOREIGN PATENTS OR APPLICATIONS 517,472   1/1940   United Kingdom................ 352/119

Primary Examiner—Monroe H. Hayes
Attorney, Agent, or Firm—Marvin H. Kleinberg

[57] ABSTRACT

A motion picture film editing-projecting system which utilizes a single sprocket wheel to advance the film and which includes a multi-face prism fixed concentrically to the sprocket wheel. The sprocket wheel is directly connected to the armature shaft of a stepping motor, and a flywheel is frictionally coupled to the armature shaft to eliminate the cogging effect without preventing rapid acceleration.

7 Claims, 9 Drawing Figures

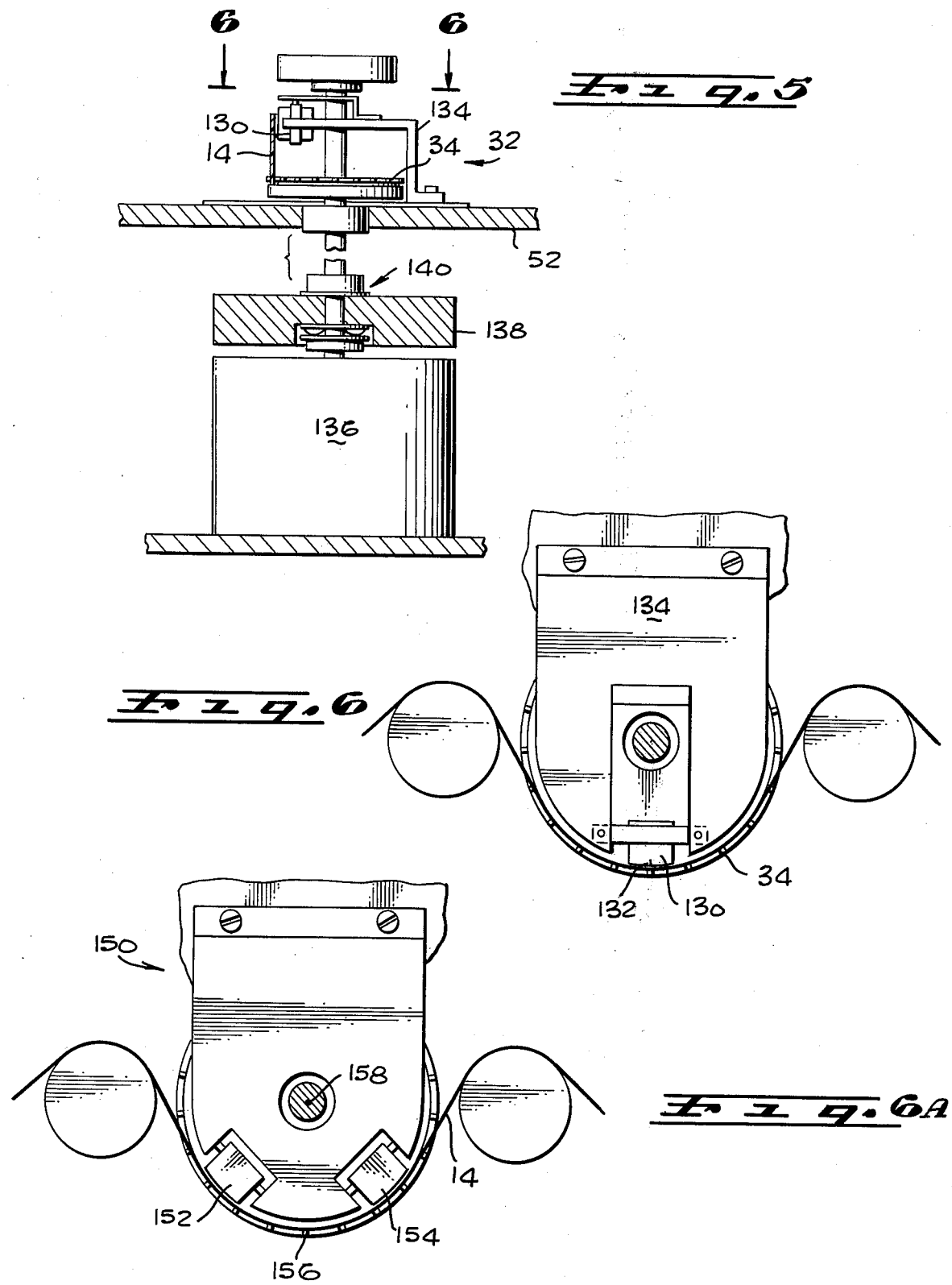

FILM TRANSPORT

BACKGROUND OF THE INVENTION

This invention relates to a transport for film that has sprocket holes.

Film editors and projectors for use with motion picture film have typically utilized a pair of sprocket wheels for advancing the film along a straight path where light is projected through the film and onto a screen. Intermittent motion of the film sometimes has been avoided by utilizing a rotating prism behind the film, but an aperture plate has normally been required in order to project a single film frame. An aperture plate produces dark areas at the top and bottom of the screen, which is often referred to as "flicker." In addition, the aperture plate can scratch the film. The use of two spaced sprocket wheels for advancing the film results in the need for using many inches of film as a threading "header" which cannot be viewed.

The projecting system can be simplified by utilizing a single sprocket wheel for advancing the film and by rotating the prism coaxially within the sprocket wheel. This reduces the amount of header required in threading and also reduces the number of separate rotating elements. If the aperture plate could be eliminated and the number of different driven elements at the projected area could be reduced to one element, then the system would not only be greatly simplified and the possibility of film damage minimized, but backlash between belt or gear-coupled elements could be eliminated so that very close control of film advancement could be achieved.

SUMMARY OF THE INVENTION

In accordance with one embodiment of the present invention, a film editor is provided which utilizes a film drive of great simplicity and which permits close control of film movement. The editor includes a single sprocket wheel for moving film between supply and take-up hubs, and a multi-facet prism fixed coaxially to the sprocket wheel to rotate at the same speed as the sprocket wheel. An optical system is provided which projects light through a film portion that is wrapped about the sprocket wheel, and then through the prism and a focusing lens apparatus onto a screen. The focusing lens includes a curvature correcting portion which corrects for curvature of the film about the sprocket wheel, so that the image is in focus on a flat screen. The need for an aperture plate or the like is eliminated by illuminating at least three film frames at all times, and by blocking out the images of the film frames on either side of the central one by masks positioned at the viewing screen.

The system permits control of film advance at the viewing area by the rotation of a single shaft that carries the sprocket wheel and prism. Close control of film advance is achieved by connecting the sprocket-and-prism shaft directly to the shaft of a stepping motor. A stepping motor with a large number of poles eliminates the need for speed reducing gears or belts, and also permits almost instantaneous acceleration and deceleration without an auxiliary electro-magnetic brake. The "cogging" effect, or vibrations which a stepping motor tends to produce as it makes incremental advances for successive pulses, is largely eliminated by the use of a flywheel coupled to the armature shaft of the motor. The flywheel is coupled to the shaft through a friction clutch, which allows slippage when the stepping motor is suddenly accelerated or decelerated, while enabling the flywheel to largely eliminate flutter during constant speed operation.

The novel features that are considered characteristic of this invention are set forth with particularity in the appended claims. The invention will best be understood from the following description when read in connection with the accompanying drawings.

BRIEF DESCRIPTION OF THE DRAWINGS

FIG. 5 is a partial perspective view taken on the line 5—5 of FIG. 1;

FIG. 6 is a view taken on the line 6—6 of FIG. 5;

FIG. 6A is a partial plan view of a sound head arrangement constructed in accordance with another embodiment of the invention, wherein two separate heads are provided;

DESCRIPTION OF THE PREFERRED EMBODIMENTS

Figure 1:
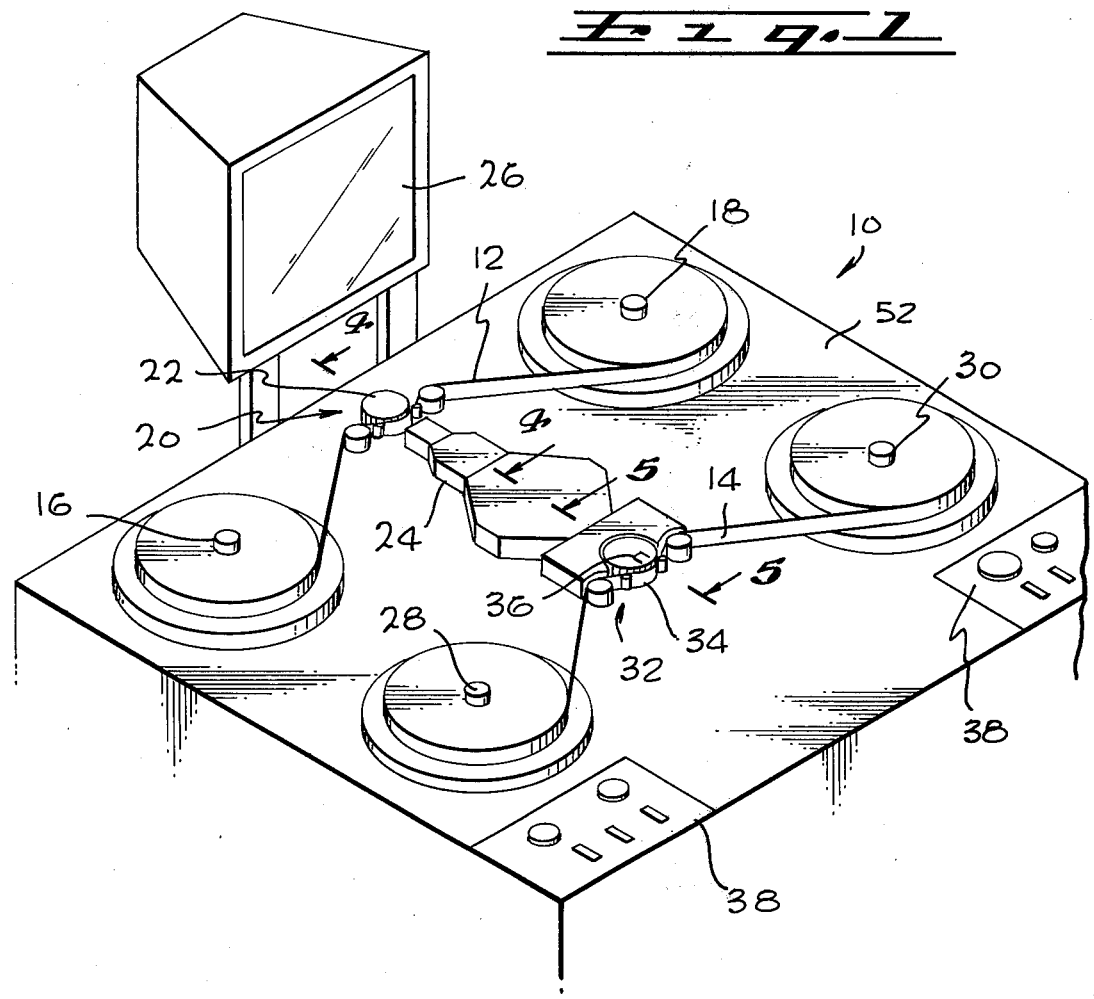
FIG. 1 is a perspective view of a film transport constructed in accordance with one embodiment of the present invention.

FIG. 1 illustrates a film editor transport 10 which is designed to read out the views on a picture film 12 and to read out the sounds recorded on a sound film 14. The picture film 12 is moved between a supply hub 16 and a take-up hub 18 past an optical readout station 20, by a single sprocket wheel 22 located at the readout station. As the picture film moves about the sprocket wheel 22, light from a source 24 is projected through the film and optical elements onto a viewing screen 26. In an analogous manner, the sound film 14 is advanced from a supply hub 28 to a take-up hub 30 past a sound readout station 32 which includes a single sprocket wheel 34 and a sound pick-up or head 36 near the sprocket wheel. The transport includes control panels 38 which permit a technician to closely control movements of the film during viewing and editing.

Figure 2:
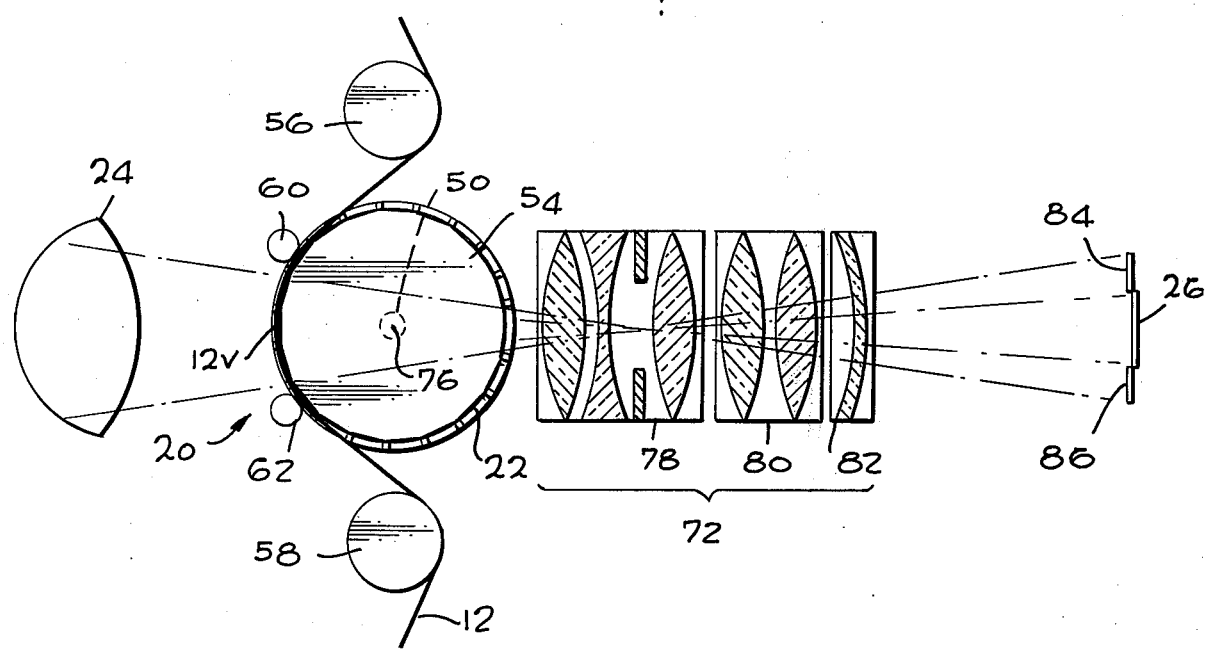
FIG. 2 is a simplified plan view of the transport of FIG. 1 showing the region near the sprocket wheel and showing the optical arrangement for viewing film at the sprocket wheel.
Figure 3:
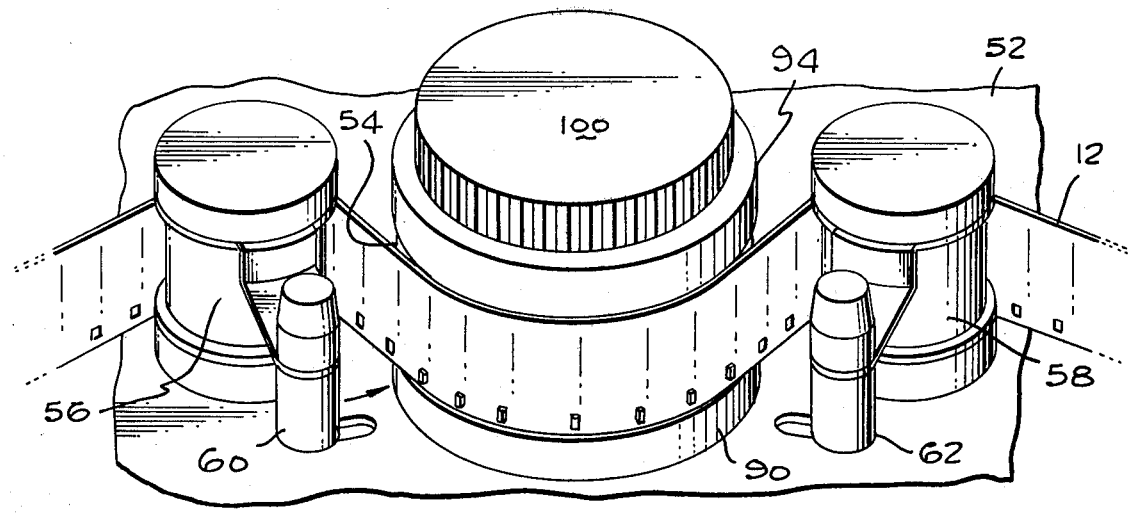
FIG. 3 is a partial perspective view of the sprocket wheel area of the transport of FIG. 1.
Figure 4:
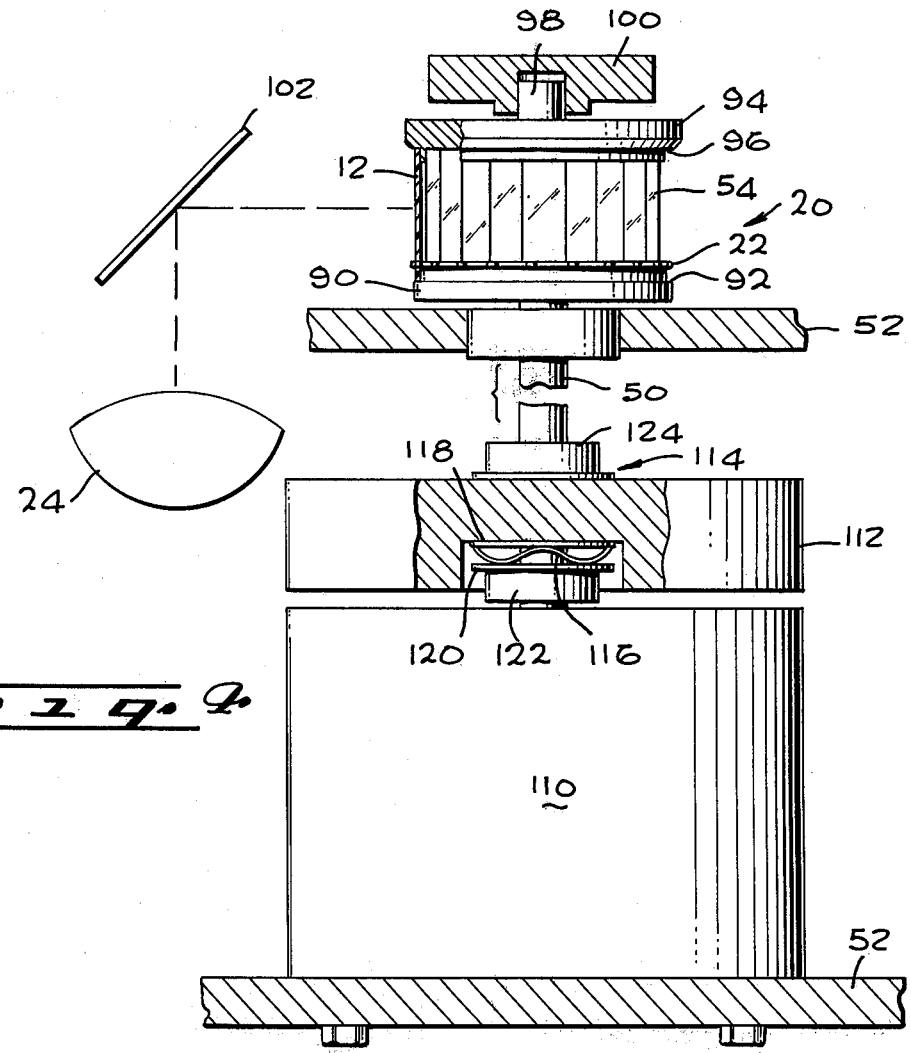
FIG. 4 is a partial sectional view taken on the line 4—4 of FIG. 1.

FIGS. 2–4 illustrate details of the apparatus at the optical readout station 20 where the picture film 12 is advanced in a closely controlled manner and viewed. The apparatus includes a sprocket wheel shaft 50 which rotates with respect to the machine frame 52 and which carries the sprocket wheel 22. A multi-faced prism 54 is fixed concentrically with respect to the sprocket wheel 22 and shaft 50, so that the sprocket wheel and prism rotate at the same speed. The film 12 is maintained partially wrapped about the sprocket wheel 22 and prism 54 by a pair of guide rollers 56, 58, and the film is held securely engaged with the sprocket wheel by a pair of keepers 60, 62 that can be released to press on a lower roller 90 so that the keepers lie close to the film portion that is wrapped about the sprocket wheel.

As best shown in FIG. 2, the viewing of the picture film 12 is accomplished by shining light from the light source 24 through a portion 12v of the film which is wrapped about the sprocket wheel 22, through the prism 54, through a focusing lens means 72 and onto the viewing screen 26. The source 24 is a prefocused lamp, although a lamp with condensing lenses can be utilized. In order to hold a short length of film in extension about the sprocket wheel, it is only necessary that the film extend between the keepers 60 and 62, although such a short film length would normally require advancement by hand turning of the sprocket wheel. In prior art systems wherein a rotating prism lay behind the film as it advanced along a straight path between two sprocket wheels, there was no necessary relationship between the rotational speed of the prism and sprocket wheels, so long as there was one advancement of a prism face for each advance of the film by one frame. Similarly, a smaller prism with fewer faces can be substituted for the prism 54 and rotated at a higher speed than the sprocket wheel 22, in order to minimize the number of faces on the prism and thereby lower its cost. However, it is found that the best picture quality is obtained by utilizing a prism which can lie as close as possible to the film, so that a prism of maximum size and maximum number of faces is desirable. By utilizing a prism wherein each face covers the same angle about the sprocket shaft axis 76 as each frame of film which extends about the sprocket wheel 22, a prism of maximum size is utilized. Such a prism needs to be rotated at the same speed as the sprocket wheel, which further simplifies the construction of the apparatus because it eliminates the need for gears or belts to couple the prism to the sprocket wheel.

The focusing lens assembly 72 includes a multi-element objective lens 78 which is capable of focusing an image from a flat film frame onto a flat screen. If the object 78 were utilized alone, distortion would occur because of the fact that the film portion being viewed is held in a curve about the sprocket wheel. The focusing lens means 72 also includes a wide angle lens 80 and a negative lens 82, which serve to compensate for the curvature of the film so that the curved film portion 12v which is being viewed is focused on the flat screen 74. The wide angle lens 80 is mounted so that its axis of major curvature is parallel to the axis 76 of the sprocket wheel about which the film is curved.

The film shown at 12 is a typical 16mm type film in which the sprockets are spaced along the length of the film by the same distance as the film frames. Thus, the film portion 12v which is being illuminated, has a length equal to three film frames. Of course, only a single one of the frames should illuminate the screen 26. Instead of utilizing an aperture plate in front of the film, light from all three frames is allowed to pass through the film to the focusing lens means 72. The film frames on either side of the central frame, which is the frame intended to be viewed, form images at 84 and 86 on either side of the screen 26. These unwanted images are eliminated by utilizing masks at 84 and 86 on either side of the screen 26. In a rear projection screen, of the type utilized in a film editor, simple masks can be utilized. Where the image is projected onto the front of a screen, as in film projection for viewing by a large audience, nonreflective borders such as those of black felt may be utilized on either side of the screen. It has been found that the amount of flicker appearing on the screen decreases as the masks 84, 86 are positioned closer to the screen and farther from the focusing lens means 72, so that it is preferable to locate the masks closer to the screen than to the focusing lens means.

The sprocket 22 and prism 54 are mounted in the manner shown in FIG. 4, with the prism 54 fixed to the sprocket wheel 22 (either directly or through a washer or the like) and with the sprocket wheel 22 fixed to a lower collar 90 that is, in turn, fixed to the upper end of the sprocket shaft 50. The lower collar 90 forms a ledge 92 that supports the lower edge of the film. A similar upper collar 94 is also provided, which is fixed to the top of the prism 54, and which forms an upper ledge 96 which guides the upper edge of the film. A short shaft 98 extending from the upper collar 94 holds a knob 100 which enables hand rotation of the sprocket and prism assembly. It may be noted that in the particular optical arrangement utilized, the pre-focused lamp 70 is located below the level of the deck, and a mirror 102 is utilized to direct light from the lamp through the film and prism.

The elimination of an aperture plate and rotating shutter, and the utilization of a single sprocket shaft 50 to rotate the driven elements at the optical readout station 20, facilitates close control of film movement. In prior art film transports, an ordinary two or four pole hysteresis motor has been utilized to drive the various elements at the viewing station. Such a motor is typically energized by 60 cycle current and rotates at approximately 1,800 or 3,600 rpm. Even a relatively small sprocket wheel, such as one whose circumference equals the length of ten film frames, must rotate at a much lower speed such as 144 rpm, in order that the film frames advance at the normal speed of 24 frames per second. Thus, prior art film transports of the type used in ordinary motion picture viewing, have utilized belts to reduce speed and to drive the multiple elements at the viewing station. Such belts have irregularities in elasticity and other characteristics which often lead to variations in sprocket wheel speed. Such flutter variations have been particularly noticable in the sound readout stations. The present invention utilizes the fact that only a single constantly rotating shaft is required, in order to simplify the drive and enable very close control of its operation.

In accordance with the present invention, the sprocket wheel shaft 50 is directly driven by a stepping motor 110. The stepping motor utilized herein has a large number of poles, normally at least ten times as many poles as the maximum number of four poles used in typical hysteresis or other motors which were incorporated in prior art film transports. The stepping motor typically has a permanent magnet rotor with a large number of poles, and the rotor or armature rotates by a predetermined fractional revolution for each pulse delivered to the motor. For the particular sprocket wheel 22 which has 20 sprockets so that its circumference equals the length of 20 film frames, and in which the prism 54 has 20 faces, the stepping motor 110 may have 72 or 144 poles, depending on the motor circuitry. When the stepping motor 110 is driven by 60 cycle current typically available from ordinary outlets, the armature shaft which is the same as the sprocket wheel shaft 50, rotates at 72 rpm so that the film is advanced at the rate of 24 frames per second.

Although the stepping motor 110 permits direct drive using a motor of reasonably small size to achieve the required torque, this type of motor can lead to rapid flutter due to the "cogging" effect, or incremental advancement of the motor armature with each applied pulse. A flywheel can be fixed to the armature, or motor shaft, to minimize flutter. However, such a flywheel can prevent acceleration of the motor if the energizing pulses are suddenly applied at the full speed rate, and can also prevent close control of shaft deceleration.

In accordance with the present invention, a flywheel 112 is provided to smooth shaft rotation. However, the flywheel is coupled by a friction coupling 114 to the shaft 50, so that the flywheel does not prevent rapid acceleration and deceleration of the shaft under the control of applied pulses. The coupling 114 is provided by a spring washer 116 which is compressed between and which bears against a pair of washers 118, 120. The washer 120 bears against a collar 122 which is fixed to the sprocket or motor shaft 50, while the other washer 118 bears against the flywheel 112. Another collar 124 which is also fixed to the shaft 50, serves to hold the spring washer 116 in compression between the washers 118, 120. The degree of spring washer compression is chosen to provide a moderate degree of frictional coupling between the shaft 50 and flywheel 112. When the motor shaft 50 suddenly accelerates, there is some slippage between the shaft and flywheel 112. However, the flywheel soon comes up to full speed, and the degree of frictional coupling is sufficient to prevent slippage between the flywheel and shaft at full speed so that the flywheel is highly effective in smoothing the rotational motion of the shaft. Instead of utilizing a frictional coupling, it is possible to utilize a highly elastic coupling such as a soft rubber ring, to connect the shaft to the flywheel. However, a frictional coupling can be more effective in holding the flywheel to the shaft at constant speed, because once the flywheel is up to full speed it is held to the shaft by static friction which tends to prevent even slight relative movements.

FIGS. 5 and 6 illustrate details of the sound readout station 32 where sound recorded on the sound film 14 is read out. The station 32 includes a sprocket wheel 34 which advances the sound film in the same manner as the sprocket wheel of the optical readout station. The particular sound film 14 is of a magnetic-type, so that a magnetic playback head 130 is utilized, although optical sound film and an optical readout head can be utilized. The playback head 130 is mounted so that it lies within the arc of the film portion which is wrapped about the sprocket wheel 34, the gap 132 of the head 130 lying substantially against the film thereat. As in the case of the optical readout station, the arrangement of the readout head 130 within the arc of film that extends about the sprocket wheel minimizes the length of film required in threading and also minimizes the number of driven elements at the station. The readout head 130 is mounted on a support 134 which is fixed to the frame 52 of the machine. The sprocket wheel 34 at the sound readout station 32 is driven by another stepping motor 136 in the same manner as the sprocket wheel of the optical readout station. Also, a flywheel 138 is coupled to the shaft of the stepping motor 136 by a frictional clutch 140 of the same design as the frictional clutch 114 utilized with the optical station.

The advancement of sound film is required in the recording of sound as well as the playback. FIG. 6A illustrates a sound readout station 150 constructed in accordance with another embodiment of the invention, which provides for accommodation of a recording head 152 and a separate monitoring or playback head 154 that is spaced along the film path from the recording head. The two heads are provided in an arrangement which utilizes a single sprocket wheel 156 to thereby minimize the number of driven elements and to minimize the required length of leader in the threading of the film. This is accomplished by mounting both of the heads 152, 154 within the arc of film 14 which is wrapped about the sprocket wheel 156, the two heads being circumferentially spaced about the axis of rotation 158 of the sprocket wheel.

Figure 7:
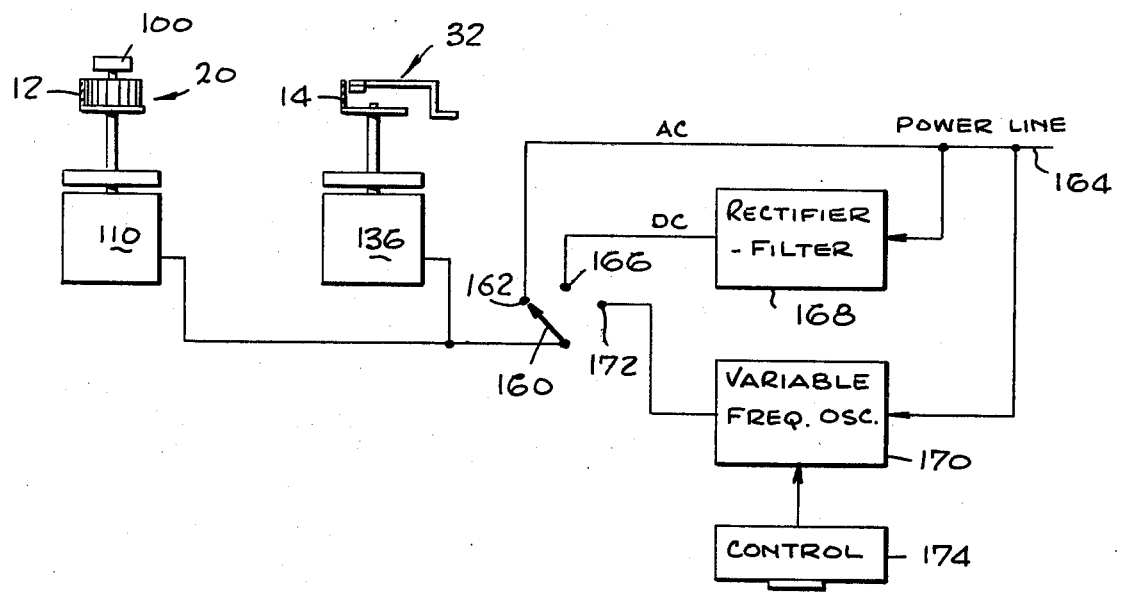
FIG. 7 is a partial schematic and block diagram of the transport of FIG. 1, showing the apparatus for energizing the picture and sound transport portions in synchronism.

The fact that both the optical readout station 20 and sound readout station 32 utilize stepping motors, not only permits close control of film past each station, but also permits close synchronization of the two films without the need for separate selsyns or the like. FIG. 7 illustrates an energizing circuit which permits advancement of film past both stations 20, 32 in close synchronism, and yet which permits great versatility of film movement. The circuit includes a switch 160 which is connected to the stepping motors 110, 136 of the two readout stations. The switch can be connected to a first contact 162 which leads to a power line 164 that supplies AC current at a predetermined rate such as 60 cycles per second. Each AC cycle advances both stepping motors by the same amount, so that the two films are advanced by the same amounts. The switch 160 can also be connected to another contact 166 which receives DC current of almost constant amplitude from a rectifier-filter circuit 168 which is energized from the power line. When the switch 160 is connected to the contact 166, the large DC voltage locks both stepping motors in position. Each stepping motor can be brought from full speed to the locked condition over the distance of a single pole, so that the positions of both films are maintained in accurate relationship.

In many applications, it is desirable to permit running of the films at a variety of speeds. This is made possible by utilizing a variable frequency oscillator 170 which can be connected through the switch 160 to the stepping motors when the switch engages a contact 172. The oscillator 170, which is energized from the power line 164, can be varied in frequency by operation of a manual control 174. Although a wide variety of speeds is possible, both stepping motors still are maintained in synchronism with one another. When the switch 160 is not connected to any of the contacts, the shafts of the stepping motors can be moved by rotating knobs, such as knob 100, to permit adjustment of the relative positions of the films 12, 14.

Figure 8:
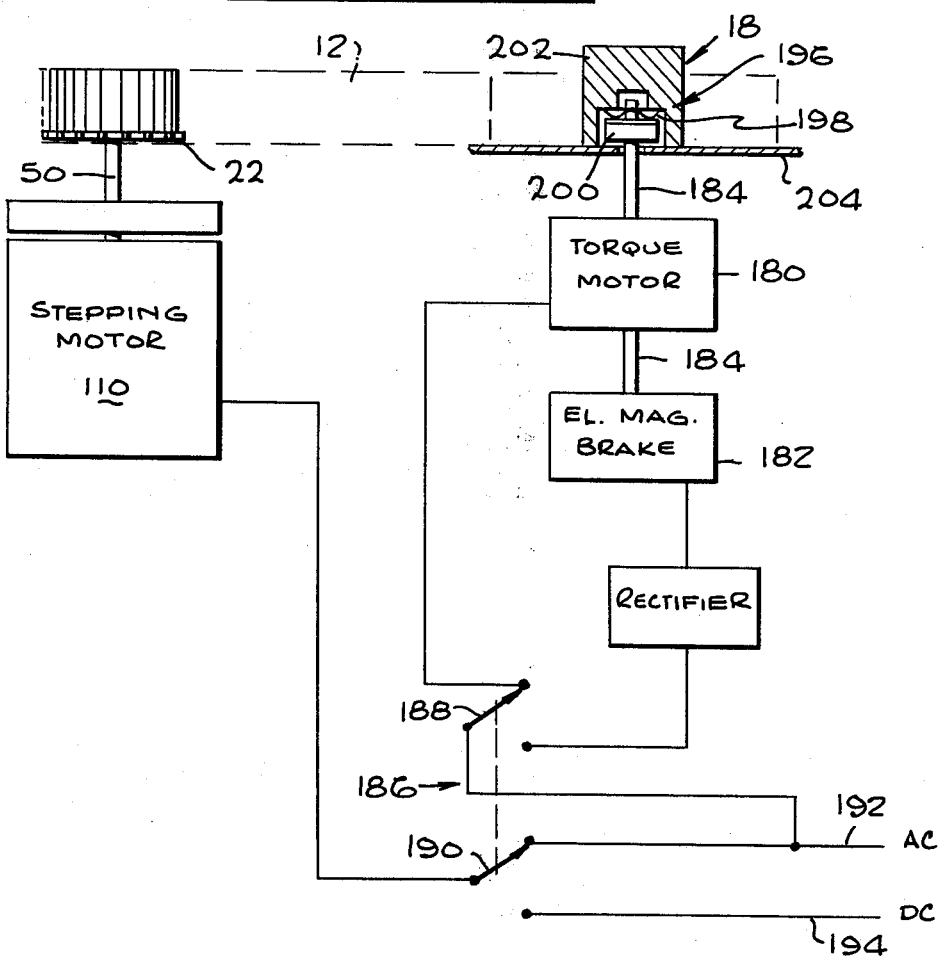
FIG. 8 is a partial schematic view of the transport of FIG. 1, showing the arrangement for controlling movement of a sprocket wheel and take-up hub.

In addition to the motors that advance the sprocket wheels, motors are also required to urge rotation of the take-up hubs. FIG. 8 illustrates an arrangement for controlling rotation of the sprocket wheel 22 and take-up hub 18, which serves to minimize slackness in the film in spite of rapid starting and stopping of the sprocket wheel, and yet which minimizes the possibility of breakage of the film. The apparatus includes a wind-up or torque motor 180 of a typical type used in such applications for supplying torque that urges the take-up hub 18 to rotate. An electro-magnetic brake 182 is connected to the shaft 184 of the wind-up motor to permit rapid stopping. A switch assembly 186 for operating the system, includes a first switch 188 which connects a current source to either the wind-up motor 180 or the brake 182. A second switch 190 connects the stepping motor to either an AC line 192 for rotation of the stepping motor, or to a DC line 194 for rapidly stopping the motor and holding it in position. The two switches 188, 190 are operated in unison, so that either both motors 110, 180 are energized to advance or the shafts of both motors are rapidly stopped. Of course other modes of energization, such as connection of the stepping motor to a variable frequency oscillator, can be utilized, although not shown herein in order to simplify the description.

The switch assembly 186 assures stopping of both motor shafts 50, 184 at approximately the same time. However, there can be a lag so that the torque motor shaft 184 may continue rotating for a brief time after the stepping motor stops. This could lead to excessive tape tension and breakage. To prevent this, a frictional coupling or clutch 196 is provided to couple the torque motor shaft 184 to the take-up hub 18. The clutch 196 is similar to the clutch 114 illustrated in FIG. 4, and includes a spring washer 198 compressed between a collar 200 that is fixed to the torque motor shaft 184 and a head piece 202 of the take-up hub. The head piece 202 is fixed to a large flange 204 of the take-up hub apparatus on which the film rests. If the sprocket wheel 22 has stopped but the wind-up motor shaft 184 continues to rotate for a brief time, tension in the film 12 will permit slippage of the friction clutch 196 so that the hub 18 can slow or stop even though the wind-up motor shaft 184 continues to rotate for a brief time.

Thus, the invention provides a film transport which utilizes a mechanism for advancing the film with a minimum of complexity and which provides simple and close control of the mechanism and therefore of film advancement. The readout station for picture film includes a sprocket wheel about which the film is partially wrapped and a prism mounted to rotate at the same speed as the sprocket wheel and positioned coaxially therewith. Viewing of the film is accomplished by shining light through the film and prism and through a focusing lens assembly onto a screen, using a focusing lens assembly which corrects for curvature of the film portion so that the image is clear on a flat screen. The light is projected through a width of film equal to that of three film frames, but the film frames on either side of the frame to be viewed are masked at or near the viewing screen. The single shaft which must be rotated at the readout station, permits direct drive using a stepping motor. The "cogging" effect of a stepping motor is substantially eliminated without preventing rapid starting and stopping, by the use of a flywheel which is frictionally coupled to the motor or sprocket wheel shaft. Two or more stepping motors for advancing two or more different films can be closely synchronized throughout operation at normal or variable speeds by connecting both motors to various energizing sources through the same switch or through switches that operate in unison. A torque motor and brake apparatus for the take-up hub can be operated in close association with a stepping motor, without the likelihood of film breakage even if stopping of the two motor shafts does not occur at exactly the same time, by the use of a frictional clutch that couples the take-up hub to the wind-up motor shaft.

Although particular embodiments of the invention have been described and illustrated herein, it is recognized that modifications and equivalents may readily occur to those skilled in the art and consequently, it is intended that the claims be interpreted to cover such modifications and equivalents.

What is claimed is:

1. In a film transport wherein film with sprocket holes is moved between a supply hub and take-up hub past a readout station by the use of a single main sprocket wheel which moves the film in an arc of the readout station, the improvement of a sprocket wheel drive comprising:

a stepping motor which advances its armature by a predetermined fractional revolution for each input pulse, said armature directly connected to the sprocket wheel to rotate the sprocket wheel at the same speed as the armature;

energizing means for applying pulses at a predetermined rate to said stepping motor;

a flywheel;

a friction clutch coupling the flywheel to the armature to minimize irregularities in armature movement of constant speed operation while facilitating starting of the motor;

an electrically energizable torque motor coupled to the take-up hub to rotate it and an electrically energizable brake assembly coupled to the take-up hub for rapidly stopping it; and said energizing means includes means for selectively applying said pulses to the stepping motor to rotate the sprocket wheel and applying current to the torque motor, or applying a substantially constant current to the stepping motor while applying current to the brake assembly to simultaneously stop the stepping motor and take-up hub.

2. The improvement described in claim 1 including;
a friction clutch coupling the brake and torque motor to the take-up hub, to permit hub rotation with drag, whereby to minimize the possibility of breaking the film if the torque motor continues to be energized after a constant current is applied to the stepping motor.

3. The improvement described in claim 1 wherein:
said energizing means includes a variable frequency oscillator and manually controllable means for varying the frequency of the oscillator, whereby to enable slowdown and speedup of the film advance rate.

4. In a film transport wherein film with sprocket holes is moved between a supply hub and take-up hub past a readout station by the use of a single main sprocket wheel which moves the film in an arc of the readout station, the improvement of a sprocket wheel drive comprising:

a stepping motor which advances its armature by a predetermined fractional revolution for each input pulse, said armature directly connected to the sprocket wheel to rotate the sprocket wheel at the same speed as the armature;

a flywheel;

a friction clutch coupling the flywheel to the armature, whereby to minimize irregularities in armature movement at constant speed operation while facilitating starting of the motor;

energizing means for applying pulses at a predetermined rate to said stepping motor;

an electrically energizable torque motor coupled to the take-up hub to rotate it and an electrically energizable brake assembly coupled to the take-up hub for rapidly stopping it; and said energizing means includes means for selectively applying said pulses to the stepping motor to rotate the sprocket wheel and applying current to the torque motor, or applying a substantially constant current to the stepping motor while applying current to the brake assembly to simultaneously stop the stepping motor and take-up hub.

5. The improvement described in claim 4 including:

a friction clutch coupling the brake and torque motor to the take-up hub, to permit hub rotation with drag, whereby to minimize the possibility of breaking the film if the torque motor continues to be energized after a constant current is applied to the stepping motor.

6. Apparatus for viewing film comprising:

a machine frame;

a pair of hubs rotatably mounted on said frame including a supply hub and a take-up hub;

an electrically energizable torque motor coupled to said take-up hub to rotate it and an electrically energizable brake assembly coupled to said take-up hub for rapidly stopping it;

a sprocket wheel rotatably mounted on said frame;

means for guiding film from around said supply hub, partially about said sprocket wheel, and thence around said take-up hub;

a prism fixed with respect to said sprocket wheel to rotate with it;

motor means for rotating said sprocket wheel and prism, said motor means including a stepping motor having a shaft directly connected to said sprocket wheel and prism to rotate them at the same speed as said motor shaft;

energizing means including means for selectively applying electrical pulses to said stepping motor to rotate said sprocket wheel and applying current to said torque motor, or applying a substantially constant current to said torque motor while applying current to said brake assembly to simultaneously stop said stepping motor and take-up hub;

a flywheel;

a clutch frictionally coupling said flywheel to said motor shaft to permit slippage between them so that said stepping motor can suddenly start without suddenly rotating said flywheel while allowing said flywheel to minimize stepping motion of said shaft after said shaft is at full speed;

means for shining light through a film portion wrapped about said sprocket wheel and through said prism; and means in the path of said light for forming an image of the film.

7. The improvement described in claim 6 including:

a second friction clutch coupling said brake and torque motor to said take-up hub, to permit hub rotation with drag, for minimizing the possibility of breaking the film if said torque motor continues to be energized after a constant current is applied to said stepping motor.

* * * * *